United States Patent
Szczepanik et al.

(10) Patent No.: US 11,310,129 B1
(45) Date of Patent: Apr. 19, 2022

(54) DISTRIBUTING TICKETS FROM DIFFERENT SUPPORT SYSTEMS

(71) Applicant: INTERNATIONAL BUSINESS MACHINES CORPORATION, Armonk, NY (US)

(72) Inventors: Grzegorz Piotr Szczepanik, Cracow (PL); Piotr Kalandyk, Zielonki (PL); Pawel Tadeusz Januszek, Cracow (PL); Michal Maciej Zalas, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 17/165,241

(22) Filed: Feb. 2, 2021

(51) Int. Cl.
  *G06F 15/16* (2006.01)
  *H04L 41/5074* (2022.01)
  *H04L 67/02* (2022.01)
  *H04L 67/133* (2022.01)
  *G06F 16/955* (2019.01)

(52) U.S. Cl.
  CPC ...... *H04L 41/5074* (2013.01); *G06F 16/9566* (2019.01); *H04L 67/02* (2013.01); *H04L 67/40* (2013.01)

(58) Field of Classification Search
  None
  See application file for complete search history.

(56) References Cited

U.S. PATENT DOCUMENTS

| | | | |
|---|---|---|---|
| 7,167,915 B2 * | 1/2007 | Bendich | G06F 11/3495 707/999.003 |
| 7,493,518 B2 | 2/2009 | Anderson et al. | |
| 8,818,833 B2 | 8/2014 | Druyan et al. | |
| 9,842,295 B2 | 12/2017 | Fisher, Jr. | |
| 9,959,161 B2 | 5/2018 | Claypool, III et al. | |
| 2003/0204644 A1 * | 10/2003 | Vincent | G06F 11/3664 719/317 |
| 2010/0199188 A1 * | 8/2010 | Abu-Hakima | H04L 67/26 715/733 |
| 2012/0321071 A1 | 12/2012 | Fisher, Jr. | |
| 2015/0117631 A1 * | 4/2015 | Tuchman | H04M 3/5233 379/265.09 |
| 2015/0142594 A1 * | 5/2015 | Lutnick | G06Q 30/0635 705/21 |
| 2016/0232774 A1 * | 8/2016 | Noland | G08B 21/0438 |
| 2017/0097861 A1 | 4/2017 | Claypool, III et al. | |
| 2017/0186270 A1 * | 6/2017 | Acres | G06Q 10/063116 |

(Continued)

OTHER PUBLICATIONS

Mell et al., "The NIST Definition of Cloud Computing", NIST, Special Publication 800-145, Sep. 2011, 7 pages.

*Primary Examiner* — Phuoc H Nguyen
(74) *Attorney, Agent, or Firm* — Anthony Curro; Andrew D. Wright; Roberts Calderon Safran & Cole, P.C.

(57) ABSTRACT

A computer-implemented method includes: receiving, by a computing device, a Uniform Resource Locator (URL) from an agent device; extracting, by the computing device, information from the URL; assigning, by the computing device, a ticket to an agent based on the information from the URL and an agent registry; updating, by the computing device and in response to the assigning, a dispatch list; and notifying, by the computing device and in response to the assigning, the agent of the assigning the ticket to the agent.

20 Claims, 6 Drawing Sheets

605 https://dispacher_server/dispatch.php?TICKET_URL=http....&USER_NAME=...&TICKET_NUMBER=...&USER_GEO=...&SUBJECT=...

(56) References Cited

U.S. PATENT DOCUMENTS

2017/0330195 A1   11/2017  Lange et al.
2019/0042988 A1*  2/2019  Brown ................ G06F 16/9535
2019/0079966 A1   3/2019  Buerk et al.
2019/0347668 A1  11/2019  Williams et al.

* cited by examiner

DISTRIBUTING TICKETS FROM DIFFERENT SUPPORT SYSTEMS

BACKGROUND

Aspects of the present invention relate generally to managing tickets in computing resource support systems and, more particularly, to distributing tickets from different support systems.

Support teams use different ticket systems to manage user requests in different computing resource support systems. Each support system has its own ticket distribution mechanism based on factors such as ticket priority and agent workload.

SUMMARY

In a first aspect of the invention, there is a computer-implemented method including: receiving, by a computing device, a Uniform Resource Locator (URL) from an agent device; extracting, by the computing device, information from the URL; assigning, by the computing device, a ticket to an agent based on the information from the URL and an agent registry; updating, by the computing device and in response to the assigning, a dispatch list; and notifying, by the computing device and in response to the assigning, the agent of the assigning the ticket to the agent.

In another aspect of the invention, there is a computer program product including one or more computer readable storage media having program instructions collectively stored on the one or more computer readable storage media. The program instructions are executable to: receive plural different Uniform Resource Locators (URLs) from plural agent devices monitoring different channels of different computing resource support systems; and for each respective URL of the plural URLs: extract information from the respective URL; assign a ticket associated with the respective URL to a respective agent based on comparing the information extracted from the respective URL to information in an agent registry; update, in response to the assigning, a dispatch list; and notify, in response to the assigning, the respective agent of the assigning the ticket to the respective agent.

In another aspect of the invention, there is system including a processor, a computer readable memory, one or more computer readable storage media, and program instructions collectively stored on the one or more computer readable storage media. The program instructions are executable to: receive plural different Uniform Resource Locators (URLs) from plural agent devices monitoring different channels of different computing resource support systems; and for each respective URL of the plural URLs: extract information from the respective URL; assign a ticket associated with the respective URL to a respective agent based on comparing the information extracted from the respective URL to information in an agent registry; update, in response to the assigning, a dispatch list; and notify, in response to the assigning, the respective agent of the assigning the ticket to the respective agent.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to managing tickets in computing resource support systems and, more particularly, to distributing tickets from different support systems. According to aspects of the invention, a browser of an agent device is provided with a customized plugin that, when invoked, creates a new URL based on user input to a computing resource support system. In embodiments, the agent device posts the new URL to a dispatcher server that receives similarly generated URLs from plural agent devices operating in different computing resource support systems. In embodiments, the dispatcher server distributes tickets to agents based on the received URLs. In this manner, implementations of the invention use a single ticket distribution mechanism to manage tickets related to plural different computing resource support systems. As a result, implementations of the invention are useful for dispatching tickets from plural different support systems to a worldwide support team of agents.

As used herein, a "computing resource support system" (also called a "support system") is a system that is configured to receive user input about a problem the user is having with a computing resource, such as a software resource or a hardware resource. Support systems generate tickets based on the user input and assign the tickets to agents. As used herein, an "agent" is a person that assists a user after the user has provided input to a support system. For example, an agent might be a software engineer that answers questions about computing resources that users post on forums. As another example, an agent might be a help desk technician that handles tickets created when a user provides input to a support system. Support systems for different computing resources are developed independently of one another and, thus, each support system has its own ticket distribution mechanism. It is common, however, for a single agent to be tasked with managing plural tickets from different support systems at the same time. This situation may arise, for example, during a transition period between different generations of computing resources, or when there is a need to satisfy requirements from historically separate parts of an organization that have been combined (e.g., due to a merger). The different support systems distribute their respective tickets to agents using their own respective mechanisms, which results in a single agent needing to be aware of the plural different ways by which he or she might receive assigned tickets from the different support systems.

Aspects of the invention provide a system that uses a single ticket distribution mechanism to manage tickets that originate from plural different computing resource support systems. Implementations of the invention leverage the fact that most support systems are web-based systems, in particular HTML (Hyper Text Markup Language) pages. In embodiments, each support system is provided with a new browser plugin that is configured to extract ticket information when the plugin is invoked by an agent. In embodiments, the plugin creates a Uniform Resource Locator (URL) using the extracted information, which may include a dispatcher server address, a ticket identifier, a user identifier (e.g., name, customer number, etc.), a subject, a geographic location, etc. In embodiments, the created URL is automatically launched to start the ticket dispatch process, which sends emails to involved agents. In embodiments, the dispatcher server has access to team lists (e.g., of available agents) and assigns tickets in a rotation order, taking agent absences into account, so that all the tickets are easily distributed and managed. Embodiments of the invention may be implemented using a combination of components including: an SQL database; a server operating system; server-side scripting language; and a web browser.

Aspects of the invention provide improvements to the technology of computing resource support systems using methods that are rooted in computer technology. For example, the plugin used in aspects of the invention is necessarily rooted in computer technology and has no equivalent in the pre-Internet world. Moreover, the URL that is created by the plugin is new information that does not exist prior to invoking the plugin, and in embodiments this new information is used in subsequent steps to assign tickets from plural different support systems to a group of available agents. In this manner, implementations of the invention utilize computer-based technology (e.g., plugins and URLs) to improve ticket distribution by using a single ticket distribution mechanism to manage tickets related to plural different computing resource support systems.

It should be understood that, to the extent implementations of the invention collect, store, or employ personal information provided by, or obtained from, individuals (for example, user name, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
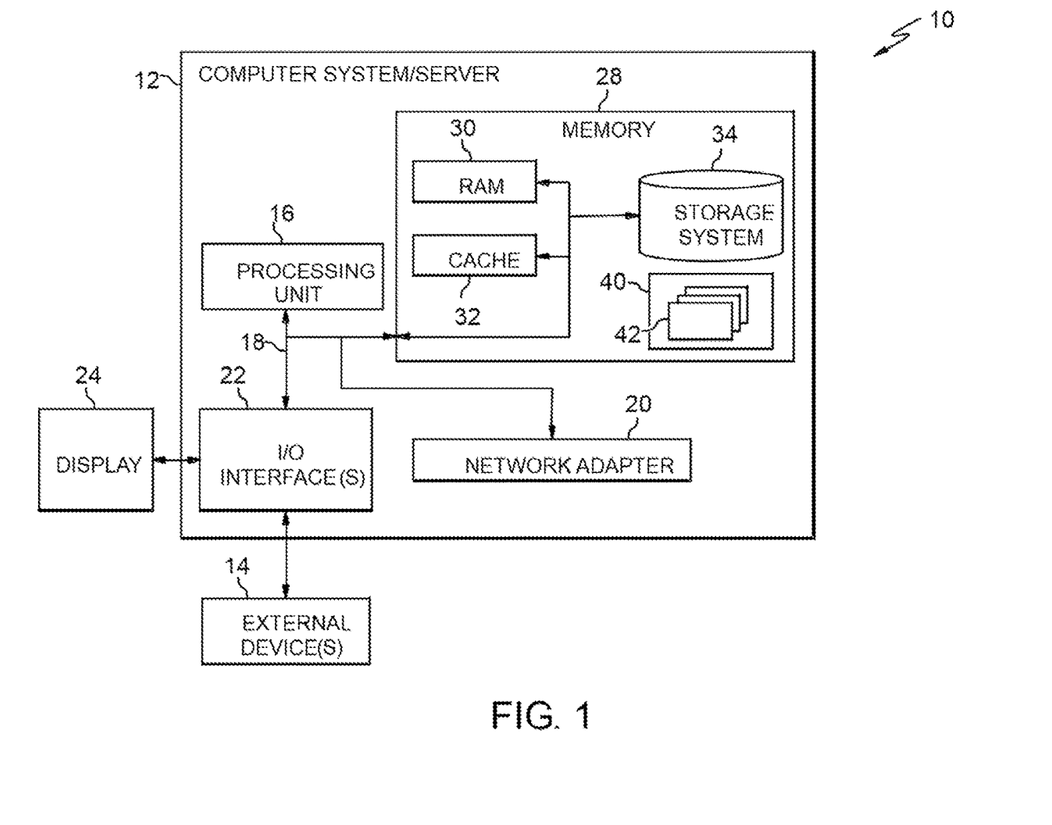
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
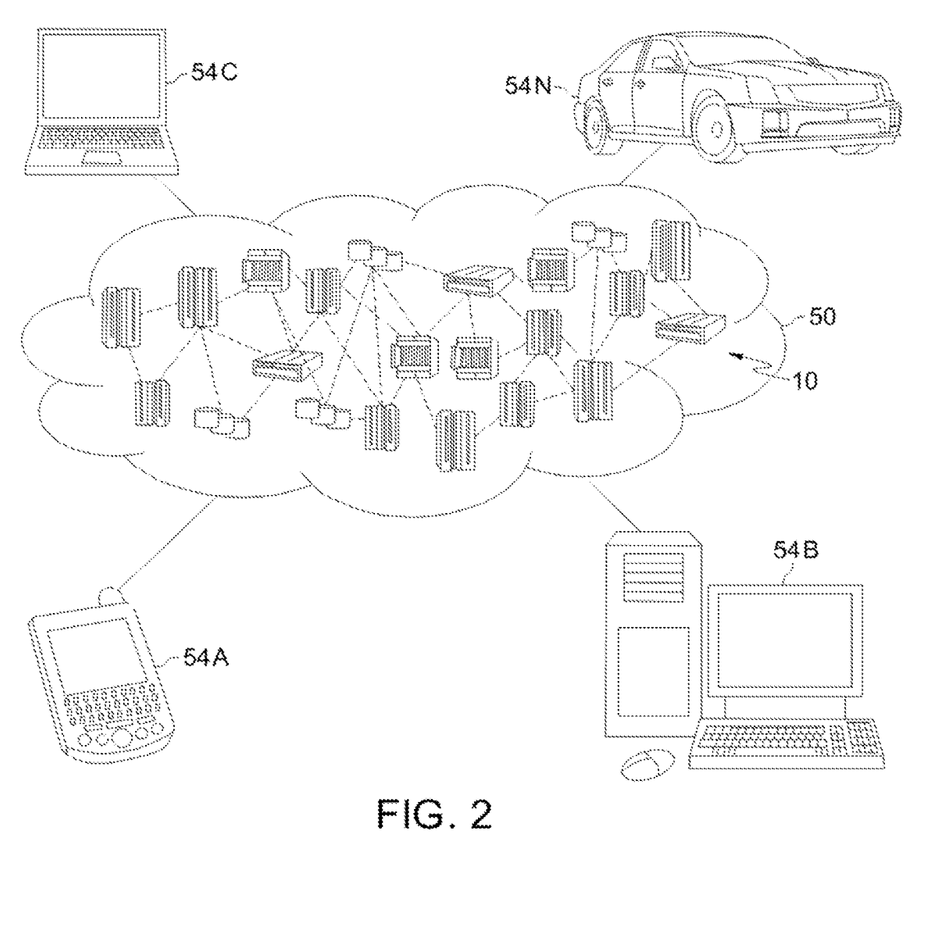
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
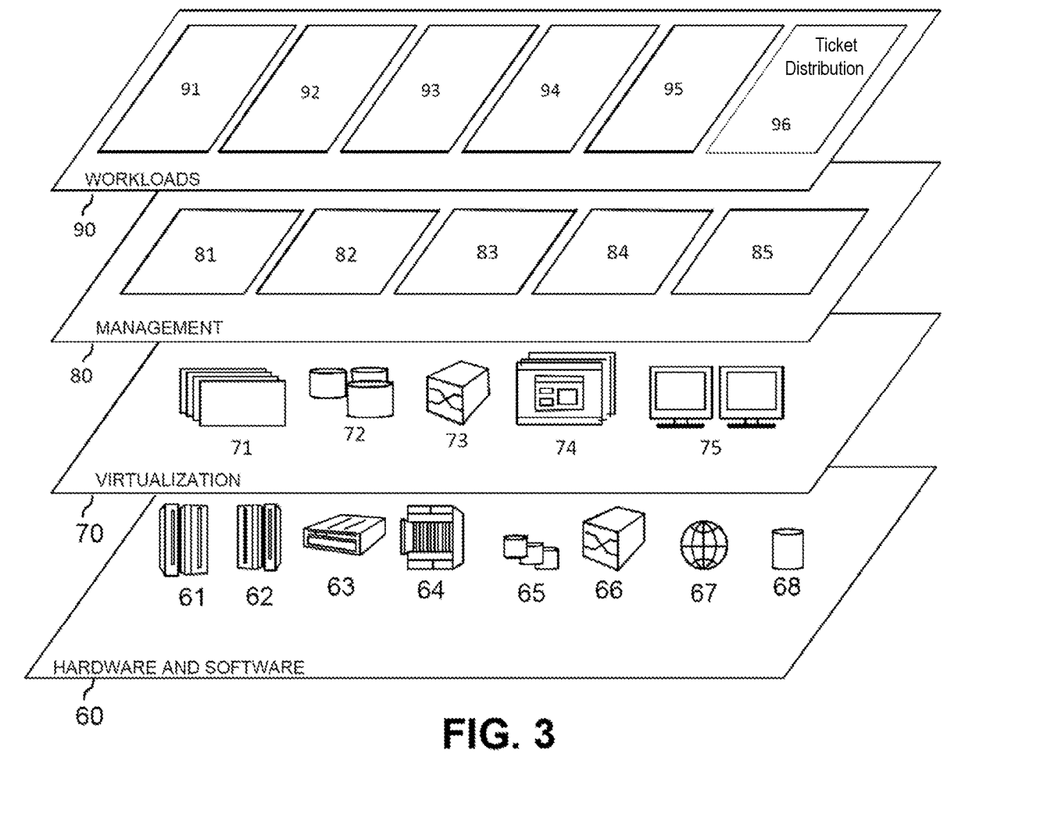
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ticket distribution 96.

Implementations of the invention may include a computer system/server 12 of FIG. 1 in which one or more of the program modules 42 are configured to perform (or cause the computer system/server 12 to perform) one of more functions of the ticket distribution 96 of FIG. 3. For example, the one or more of the program modules 42 may be configured to: receive a URL from an agent device that has invoked a plugin; extract information from the URL; assign a ticket to an agent based on the extracted information and information contained in an agent registry; update a dispatch list based on the assigning the ticket to the agent; and notify the agent of the assigned ticket.

Figure 4:
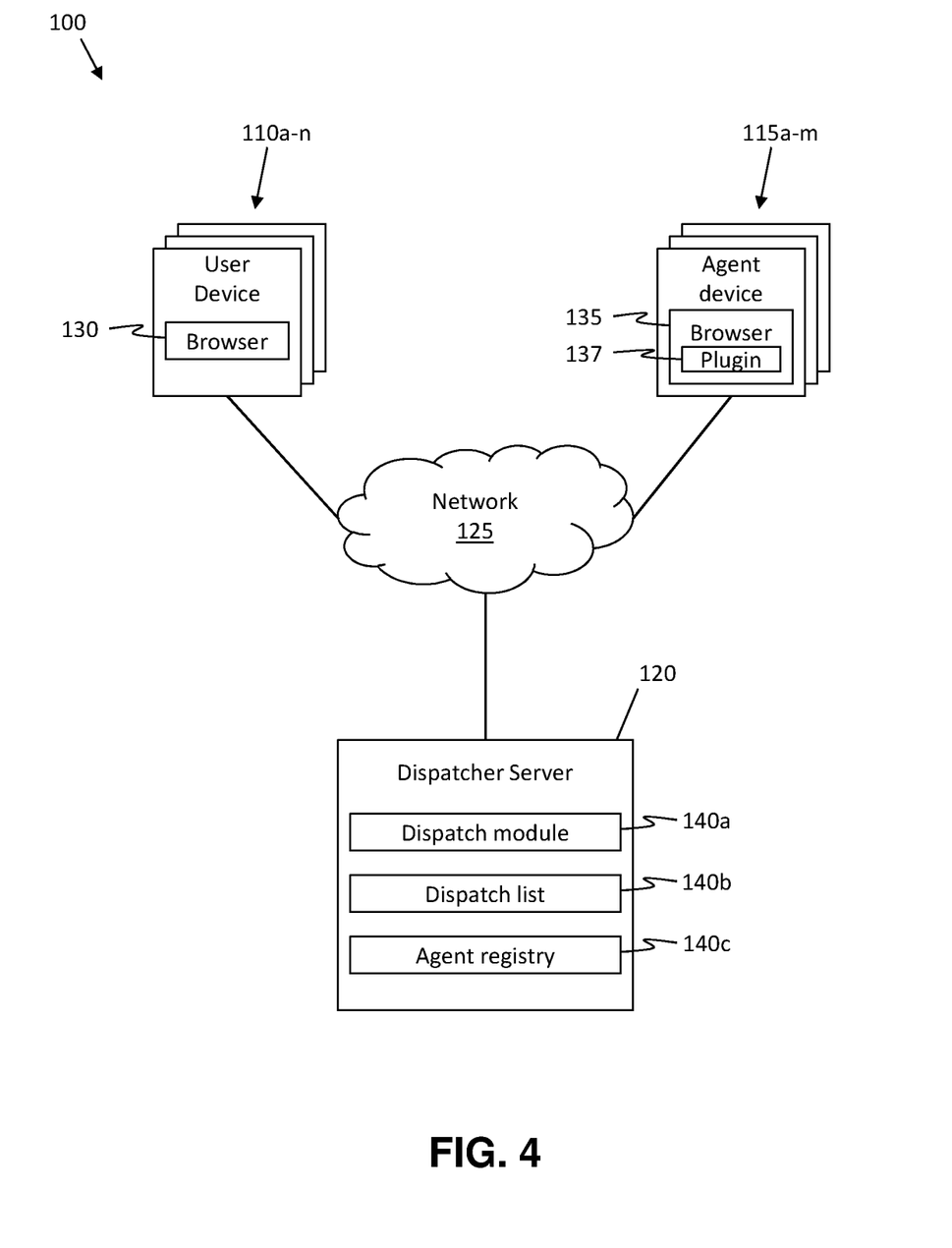
FIG. 4 shows a block diagram of an exemplary environment in accordance with aspects of the invention.

FIG. 4 shows a block diagram of an exemplary environment 100 in accordance with aspects of the invention. In embodiments, the environment 100 includes user devices 110a-n, agent devices 115a-m, and a dispatcher server 120 all connected to a network 125. In embodiments, the network 125 includes one or more communication networks such as one or more of a LAN, a WAN, and the Internet. In a cloud implementation, the network 125 is part of the cloud computing environment 50 of FIG. 2, the user devices 110a-n and agent devices 115a-m correspond to computing devices 54A-N shown in FIG. 2, and the dispatcher server 120 corresponds to one or more cloud computing nodes 10 shown in FIG. 2.

Each of the user devices 110a-n comprises a computer device such as a desktop computer, laptop computer, tablet computer, smartphone, etc., and includes one or more components of computer system/server 12 of FIG. 1. There may be any desired number "n" of the user devices 110a-n. In embodiments, each user device 110a-n runs a browser 130 by which a user of the user device accesses one or more support systems. The browser 130 may comprise a web browser or other software application that presents a user interface on the user device, the user interface being configured to permit a user to provide input to the support system. In embodiments, the browser 130 is configured such that a user of a particular user device 110a-n can access different support systems, e.g., via different web pages, different application program interfaces (APIs), etc.

As used herein, a "user" is a person who provides input, via the browser 130, to a support system for a computing resource (e.g., software, hardware, etc.). For example, a user might be a person that posts a question to a forum about their laptop computer. As another example, a user might be an enterprise employee that creates a ticket for a problem they are experiencing with their enterprise software. These examples are not limiting, and other types of users are contemplated within the scope of this disclosure. Plural different users can utilize a same computing resource and, thus, provide different inputs to a same support system. Additionally, a single user might utilize plural different computing resources and, thus, provide different inputs to plural different support systems. Similarly, plural different users can utilize plural different computing resources and, thus, provide different inputs to plural different support systems.

Each of the agent devices 115a-m comprises a computer device such as a desktop computer, laptop computer, tablet computer, smartphone, etc., and includes one or more components of computer system/server 12 of FIG. 1. There may be any desired number "m" of the agent devices 115a-m. In embodiments, each agent device 115a-m runs a browser 135 by which an agent using the agent device accesses one or more support systems. The browser 135 may comprise a web browser or other software application that presents a user interface on the agent device, the user interface being configured to permit an agent to provide input to the support system. In embodiments, the browser 135 is configured such that an agent using a particular agent device 115a-m can access different support systems, e.g., via different web pages, different application program interfaces (APIs), etc.

As used herein, an "agent" is a person that assists a user after the user has provided input to a support system. For example, an agent might be a software engineer that answers questions about computing resources that users post on forums. As another example, an agent might be a help desk technician that handles tickets created when a user provides input to a support system. These examples are not limiting, and other types of users are contemplated within the scope of this disclosure. In embodiments, a group of plural agents handles user inputs from plural different support systems for different computing resources, and aspects of the invention are directed to distributing tickets from the plural different support systems amongst the agents in the group.

According to aspects of the invention, at least one plugin 137 is installed in the browser 135 in each agent device 115a-m. In embodiments, the plugin 137 is a software component that adds a customized functionality to the browser 135 as described herein. In one example, the plugin is a script that is customized to a particular web page and is programmed to extract certain predefined information from that web page and create a new URL that includes the dispatcher server address and the extracted information. In embodiments, the plugin 137 causes the browser 135 to display an input object (referred to herein as a PD button) in the user interface of the browser 135 on the agent device 115a-m. In implementations, an agent using one of the agent devices 115a-m selects (e.g., clicks, etc.) the PD button to start a dispatch process for handling an input that a user has provided to a support system using the browser 130 of a user device 110a-n. The dispatch process that occurs after the agent selects the PD button is described in greater detail herein with respect to FIGS. 5-7. In embodiments, the decision to start the dispatch process is reserved for a dispatching agent using one of the agent devices 115a-n. For this reason, the plugin 137 providing the PD button is installed only in the browsers 135 of the agent devices 115a-m and is not installed in the browsers 130 of the user devices 110a-n.

The dispatcher server 120 comprises a server computer device and includes one or more components of computer system/server 12 of FIG. 1. In embodiments, the dispatcher server 120 comprises dispatch module 140a, which may comprise one or more program modules such as program modules 42 described with respect to FIG. 1. In embodiments, the dispatcher server 120 also maintains and updates a dispatch list 140b and an agent registry 140c, each of which may include one or more data structures stored in a storage system such as storage system 34 described with respect to FIG. 1. The dispatcher server 120 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the dispatch module 140a is configured to perform one or more steps of processes described herein, including but not limited to: receive a URL from an agent device 115a-m that has invoked the plugin 137; extract information from the URL; assign a ticket to an agent based on the extracted information and information contained in the agent registry 140c; update the dispatch list 140b based on the assigning the ticket to the agent; and notify the agent of the assigned ticket.

In embodiments, the dispatch list 140b stores data that defines assignments of tickets to agents. In one example, the dispatch list 140b contains a respective entry corresponding to each ticket received and dispatched by the dispatcher server 120, the entry containing data such as: ticket identifier (e.g., ticket number or other data that uniquely identifies this ticket); support system identifier (e.g., data that defines which one of the plural different support systems this ticket originated in); agent identifier (e.g., a name or number of an agent to whom this ticket is assigned); and date information (e.g., date the ticket was created, date the ticket was assigned to the agent). In embodiments, the dispatcher server 120 updates the dispatch list 140b in response to the dispatcher server 120 assigning a ticket to an agent. In this manner, the dispatcher server 120 keeps the dispatch list 140b updated as new tickets are received and assigned.

In embodiments, the agent registry 140c stores data that defines attributes of agents in a group of agents to which the dispatcher server 120 assigns tickets. In one example, the agent registry 140c contains a respective entry corresponding to each agent in the group of agents, the entry containing data such as: agent identifier (e.g., a name or number of this agent); geographic location (e.g., geographic location where this agent works); timezone (e.g., from Coordinated Universal Time (UTC) timezone of the geographic location where this agent works); and availability (e.g., the normal working hours for this agent and scheduled absences). In some embodiments, for a given ticket, the dispatcher server 120 compares information in the URL to information in the agent registry 140c and assigns the ticket to a particular agent based on this comparing.

In some embodiments, a single entity (e.g., a corporate organization) may own and/or control both the dispatch server 120 and the agent devices 115a-m. In other embodiments, different entities may own and/or control the dispatch server 120 and the agent devices 115a-m.

Figure 5:
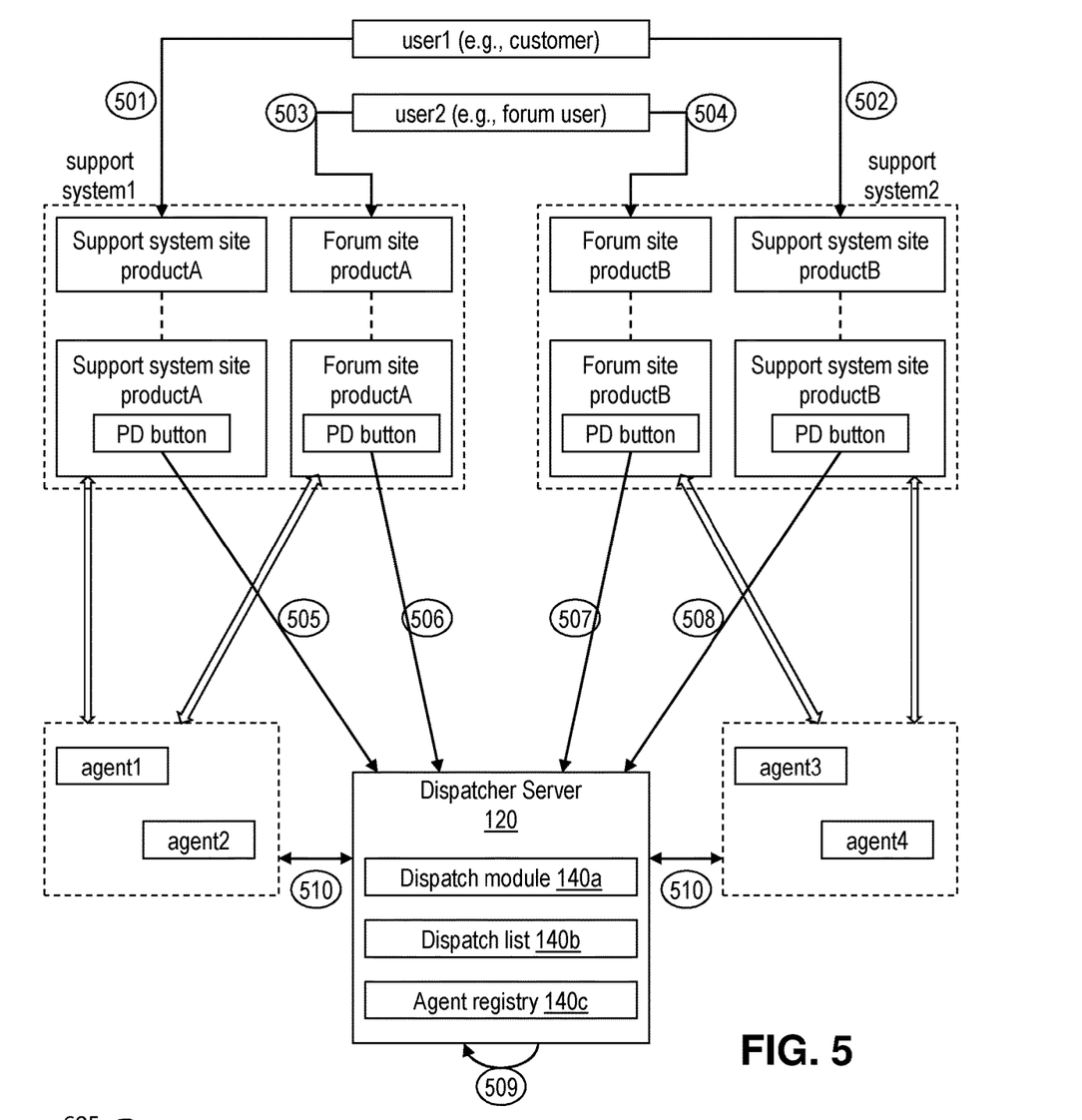
FIG. 5 shows a block diagram of an exemplary implementation in accordance with aspects of the invention.

FIG. 5 shows a block diagram of an exemplary implementation in accordance with aspects of the invention. Aspects of the exemplary implementation may be carried out in the environment of FIG. 4 and are described with reference to elements depicted in FIG. 4.

As shown in FIG. 5, at step 501 a first user (e.g., user1) creates a ticket at the support system site for productA. In this example, the support system site for productA is an HTML page and user1 utilizes a browser (e.g., browser 130) to access the HTML page and create a ticket in a manner prescribed by the HTML page. In this example, the support system site for productA is a site that is dedicated for users to create tickets for problems with productA, and may have one or more input fields that prompt the user to enter data that describe the problem the user is having with productA.

At step 502, the first user (e.g., user1) creates a ticket at the support system site for productB. In this example, the support system site for productB is an HTML page and user1 utilizes a browser (e.g., browser 130) to access the HTML page and create a ticket in a manner prescribed by the HTML page. In this example, the support system site for productB is a site that is dedicated for users to create tickets for problems with productB, and may have one or more input fields that prompt the user to enter data that describe the problem the user is having with productB. In this example, productB is a different computing resource than productA, and the support system site for productB is a different site than the support system site for productA.

Still referring to FIG. 5, at step 503 a second user (e.g., user2) posts a question at a forum site for productA. In this example, the forum site for productA is an HTML page and user2 utilizes a browser (e.g., browser 130) to access the HTML page and post a comment or question that is visible by other users of the forum. In this example, the forum site for productA is an Internet forum or message board, which is an online discussion site where users can hold conversations in the form of posted messages. In this example, the forum site for productA is a different site than the support system site for productA. In this manner, the support system for productA has two different channels (i.e., the support system site for productA and the forum site for productA) that users can access to obtain help for problems with productA.

At step 504, the second user (e.g., user2) posts a question at a forum site for productB. In this example, the forum site for productB is an HTML page and user2 utilizes a browser (e.g., browser 130) to access the HTML page and post a comment or question that is visible by other users of the forum. In this example, the forum site for productB is an Internet forum or message board, which is an online discussion site where users can hold conversations in the form of posted messages. In this example, the forum site for productB is a different site than the support system site for productB. In this manner, the support system for productB has two different channels (i.e., the support system site for productB and the forum site for productB) that users can access to obtain help for problems with productB. In this example, the forum site for productB is a different site than the forum site for productA.

In the example shown in FIG. 5, the support system site for productA and the forum site for productA are included in a same support system referred to as support system1. Also, the support system site for productB and the forum site for productB are included in a same support system referred to as support system2. In some embodiments, a single support system provides support for plural different products. So in the example of FIG. 5, support system1 may provide support for plural products such as productA, productC, and productD. Similarly, support system2 may provide support for plural other products such as productB, productX, productY, and productZ.

With continued reference to FIG. 5, one or more agents tasked with monitoring the support sites and forum sites utilizes their browser (e.g., browser 135) to access the support system site for productA, the support system site for productB, the forum site for productA, and the forum site for productB. In accordance with aspects of the invention, and as previously described with respect to FIG. 4, the agent's browser 135 includes at least one plugin 137 that is configured to show a selectable object (e.g., the PD button) in the interface displayed by the browser 135. In embodiments, when the agent selects the object (e.g., clicks the PD button), this invokes the plugin 137 and causes the plugin 137 to extract certain predefined information from the HTML page that the browser 135 is currently on. In embodiments, because each site is different (e.g., the support system site for productA, the support system site for productB, the forum site for productA, and the forum site for productB are all different sites), there are plural different plugins 137 with each respective one of the plural plugins being unique to a respective one of the sites. In this manner, each different plugin 137 is tailored to extract certain predefined information from the specific HTML page with which the plugin is uniquely associated. As a result, in some implementations a monitoring agent's browser 135 has plural different PD buttons, one for each plugin 137 (e.g., one PD button for the support system site for productA, another PD button for the support system site for productB, another PD button for the forum site for productA, and another PD button for the forum site for productB).

In some embodiments, the same PD button may be used when providing support for any of the different products supported by a single support system, and there need not be a different PD button for each product. In this manner, the agent will use the same PD button for different products running on the same support system. So for example, an agent may use a single PD button (e.g., PD1) for all the products handled by support system1, and another agent may use a single PD button (e.g., PD2) for all the products handled by support system2. In embodiments, the plugin parses the HTML page (either the site or forum) and extracts fields with data. In embodiments, the HTML page has the same code for support system1 but different code for support system2 since they are delivered by different software vendors. Also, as noted above, the HTML code may be different for a site versus a forum. In some further embodiments, the approach is modified to have only one PD button. In these embodiments, the plugin is programmed to recognize the HTML origin in a first step and then apply different extraction mechanisms for different support systems.

In some instances, the monitoring agent determines that a user input (e.g., a ticket or a forum post) is not appropriate for dispatching to an agent. This might be because the user input is not sufficiently descriptive or is posted to an incorrect site. In other instances, when the monitoring agent determines that the user input is appropriate for dispatching to an agent, then the monitoring agent clicks the PD button (visible in their browser 135) that is associated with the particular site that the agent is viewing.

For example, at step 505, an agent monitoring the support system site for productA reviews the ticket created at step 501 and clicks the PD button for the support system site for productA (visible in the monitoring agent's browser 135) to start the dispatch process for this ticket. In response to the monitoring agent clicking the PD button, the plugin 137 associated with this PD button extracts certain predefined information from the support system site for productA. In embodiments, the predefined information includes a ticket identifier (e.g., a ticket number), a user identifier (e.g., name, customer number, etc.), a subject, and a geographic location (e.g., a geographic location of the user). In embodiments, the plugin 137 creates a new URL using the extracted information and a server address of the dispatcher server 120. An example of a new URL created by a plugin 137 in accordance with aspects of the invention is shown at element 605 of FIG. 6. Still referring to step 505, in embodiments the plugin 137 posts the new URL to the dispatcher server 120, e.g., via the network 125.

At step 506, an agent monitoring the forum site for productA reviews the question posted at step 503 and clicks the PD button for the forum site for productA (visible in the monitoring agent's browser 135) to start the dispatch process for this question. In response to the monitoring agent clicking the PD button, the plugin 137 associated with this PD button extracts certain predefined information from the forum site for productA. In embodiments, the predefined information includes a ticket identifier (e.g., a ticket number), a user identifier (e.g., name, customer number, etc.), a subject, and a geographic location (e.g., a geographic location of the user). In embodiments, the plugin 137 creates a new URL using the extracted information and a server address of the dispatcher server 120. In embodiments the plugin 137 posts the new URL to the dispatcher server 120, e.g., via the network 125.

Similarly, at steps 507 and 508, the monitoring agent (or agents) invokes the appropriate plugin for these sites by clicking the appropriate PD button, which creates a new URL and posts the new URL to the dispatcher server. Notably, the URLs created at step 505, 506, 507, and 508 all have the same server address of the dispatcher server 120, but differ from one another due to the different values for the other extracted data (e.g., ticket identifier, user identifier, subject, and geographic location). In this manner, tickets from plural different support systems (e.g., that of productA and that of productB), and tickets from different channels within a same support system (e.g., the support system site for productA and the forum site for productA), are routed to the same dispatcher server 120 for distribution.

Still referring to FIG. 5, at step 509 the dispatcher server 120 assigns the tickets (e.g., the tickets identified in the URLs of steps 505, 506, 507, 508) to respective agents from a group of plural agents according to one or more dispatching rules. In embodiments, posting a URL to the dispatcher server 120 starts script processing (e.g., PHP script processing performed by the dispatch module 140a) on the dispatcher server 120 with the given parameters defined by the data contained in the URL. In embodiments, the dispatch module 140a compares information contained in the URL to information contained in the agent registry 140c and assigns the ticket defined in this URL to an agent in defined in the agent registry 140c based on this comparing. The comparing can involve any number of desired parameters that are available in the information contained in the URL to information contained in the agent registry 140c. In one example, the dispatch module 140a extracts the geographic location of the user from the URL, finds all agents in the agent registry 140c that have a same geographic location as that extracted from the URL, and assigns the ticket to the next available agent that has the same geographic location as that extracted from the URL. In this example, the dispatch module 140a determines all agents that are currently available by analyzing the availability (e.g., the normal working hours for this agent and scheduled absences, as defined in the agent registry 140c) of all agents that are in the same geographic location of the user, and selects the next such agent in a rotating fashion. In this manner, tickets are substantially evenly distributed amongst available agents that meet the criteria (e.g., available and in the same geographic location as the user).

At step 509, after determining an agent to which to assign the ticket associated with a particular URL, the dispatcher server 120 updates the dispatch list 140b based on the assignment. In embodiments, the dispatch module 140a of the dispatcher server 120 updates the dispatch list 140b with data for each assigned ticket, the data including for example: ticket identifier (e.g., ticket number or other data that uniquely identifies this ticket); support system identifier (e.g., data that defines which one of the plural different support systems this ticket originated in); agent identifier (e.g., a name or number of an agent to whom this ticket is assigned); and date information (e.g., date the ticket was created, date the ticket was assigned to the agent). In this example, the dispatcher server 120 updates the dispatch list 140b with the assignments of the each of tickets identified in the URLs of steps 505, 506, 507, 508.

At step 510, the dispatcher server 120 notifies the agent that is assigned to a ticket at in step 509. In one implementation, the dispatch module 140a includes a PHP script that uses an email server application program interface (API) to send a notification to an agent that is assigned a ticket. This is just one example, and other notification methods are possible. In this example, the dispatcher server 120 notifies the respective assigned agent for each of the tickets identified in the URLs of steps 505, 506, 507, 508. In this manner, implementations of the invention use a single ticket distribution mechanism (the dispatcher server 120) to manage tickets related to plural different support systems (e.g., support system1 and support system2), and this single ticket distribution mechanism dispatches tickets from the plural different support systems to a worldwide team of agents.

Figure 7:
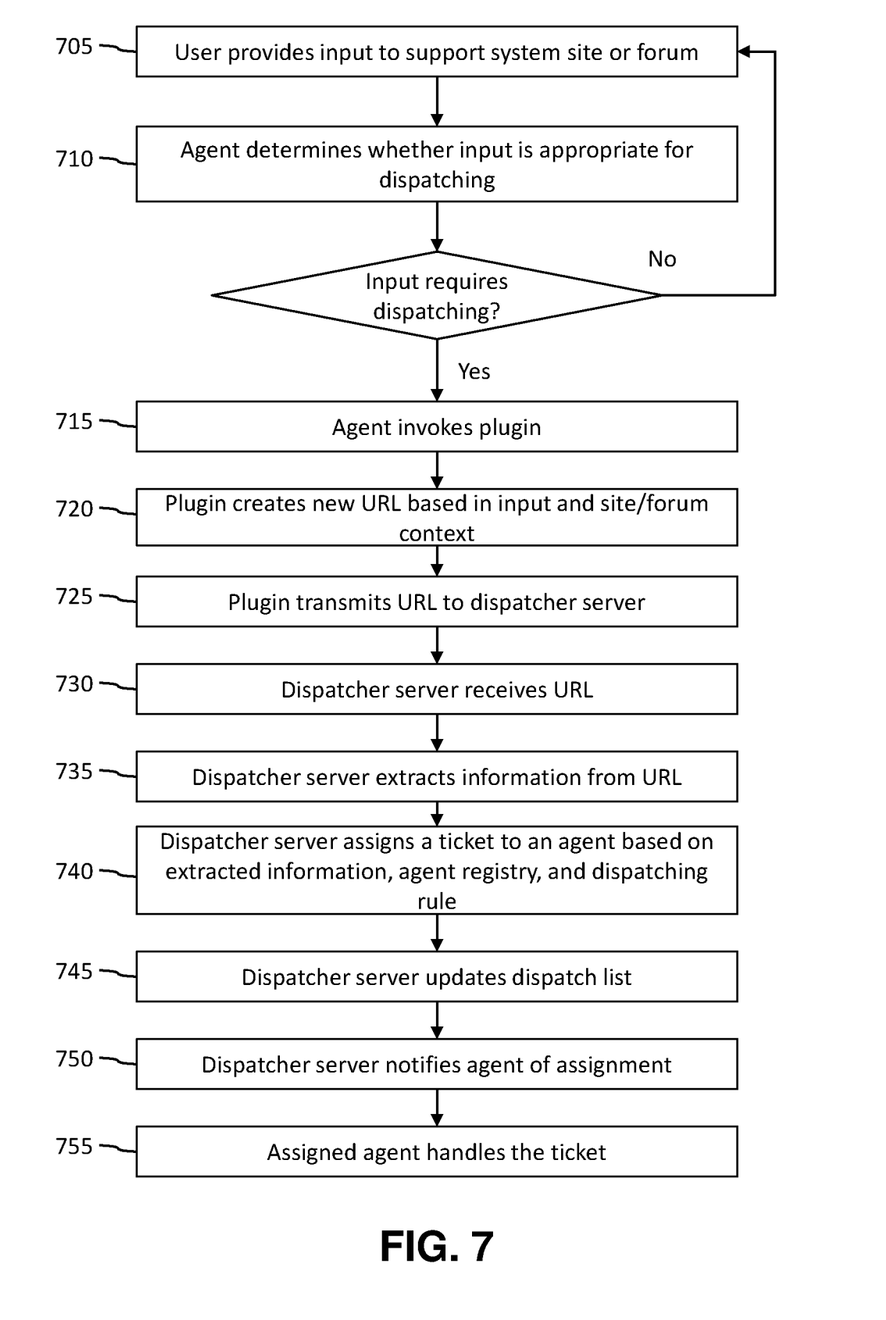
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 4 and are described with reference to elements depicted in FIG. 4.

At step 705, a user provides input to a support system. In embodiments, and as described with respect to FIGS. 4 and 5, the user utilizes a browser 130 of their user device 110a-n to access an HTML page of a support system and provide input at the HTML page. In examples, the input comprises creating a ticket or posting a question to a forum.

At step 710, an agent determines whether the user input (from step 705) is appropriate for dispatching. In embodiments, and as described with respect to FIGS. 4 and 5, not all user inputs are forwarded to the dispatcher server 120. In the event the agent determines the user input is not appropriate for dispatching, then the process returns to step 705. In the event the agent determines the user input is appropriate for dispatching, then at step 715 the agent invokes the plugin. In embodiments, and as described with respect to FIGS. 4 and 5, the agent utilizes a browser 135 of their agent device 115a-m to invoke a plugin 137 that is specific to the channel in which the user input was provided. For example, when the user input is provided via the support system site for productA, the agent invokes the plugin that is uniquely associated with the support system site for productA. In embodiments, and as described herein, invoking the plugin 137 is accomplished by selecting a selectable object in the agent browser 135. In a specific example, the selectable object is the PD button associated with the particular plugin.

At step 720, in response to being invoked at step 715, the plugin creates a new URL based on the user input. In embodiments, and as described with respect to FIGS. 4 and 5, in response to the agent clicking a PD button, the plugin 137 associated with this PD button extracts certain predefined information from the channel (e.g., the particular HTML page) in which the user input was provided at step 705. In embodiments, the predefined information includes a ticket identifier (e.g., a ticket number), a user identifier (e.g., name, customer number, etc.), a subject, and a geographic location (e.g., a geographic location of the user). In embodiments, the plugin 137 creates a new URL using the extracted information and a server address of the dispatcher server 120. In the example shown in FIG. 6, the URL includes: the server address of the dispatcher server 120 ("https://dispatcher_server/dispatch.php"); a ticket identifier ("TICKET_NUMBER= . . . "); a user identifier ("USER_NAME= . . . "); a subject ("SUBJECT= . . . "); and a geographic location ("USER_GEO= . . . "). Other information may also be included, such as product identifier (e.g., "PRODUC= . . . ") to differentiate between different products, and support system identifier (e.g., "SUPPORT_SYSTEM= . . . ") to differentiate between different support systems. In embodiments, the URL also includes data that identifies a support system that originated the ticket. In the example shown in FIG. 6, the URL includes "TICKET_URL=http . . . " which identifies the channel (e.g., one of the support system site for productA, the support system site for productB, the forum site for productA, and the forum site for productB) in which the ticket was created. Because the dispatcher server 120 receives and distributes tickets from plural different support systems, having data in the URL that identifies the originating support system is useful for the agent that receives the ticket assignment, e.g., so that this agent can determine the particular support system (and channel) to which this ticket belongs.

At step 725, the plugin transmits the new URL to the dispatcher server. In embodiments, and as described with respect to FIGS. 4 and 5, the plugin 137 transmits the new URL (created at step 720) to the dispatcher server 120, e.g., via the network 125. In one example, the plugin 137 accomplishes this using a Hypertext Transfer Protocol (HTTP) POST request to the dispatcher server 120, the POST request including the newly created URL.

At step 730, the dispatcher server receives the URL that was transmitted at step 725. In the noted example, the dispatcher server 120 receives the POST request that contains the newly created URL, e.g., via the network 125.

Figure 6:
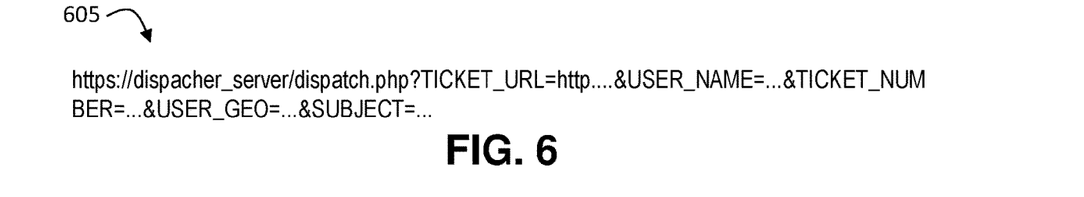
FIG. 6 shows an exemplary URL created by a plugin in accordance with aspects of the invention.

At step 735, the dispatcher server extracts information from the URL. In embodiments, and as described with respect to FIGS. 4 and 5, the dispatch module 140a of the dispatcher server 120 extracts information from the URL that was contained in the POST request. In one example, the data is encoded in the URL using keys and values that are encoded in key-value tuples separated by '&', with '=' between the key and the value, for example, as shown in FIG. 6. In embodiments, the dispatch module 140a uses these delimiters to identify and extract the data contained in the URL.

At step 740, the dispatcher server assigns the ticket to an agent based on the extracted information, an agent registry, and a dispatching rule. In embodiments, and as described with respect to FIGS. 4 and 5, the dispatch module 140a of the dispatcher server 120 compares the extracted information from the URL to information defined in the agent registry 140c. Based on this comparing, the dispatch module 140a assigns the ticket associated with this URL to one of the agents defined in the agent registry 140c based on one or more dispatching rules.

At step 745, the dispatcher server updates the dispatch list. In embodiments, and as described with respect to FIGS. 4 and 5, in response to assigning the ticket to an agent at step 740, the dispatch module 140a of the dispatcher server 120 updates data in the dispatch list 140b to reflect the assignment that was made at step 740.

At step 750, the dispatcher server notifies the agent of the assignment. In embodiments, and as described with respect to FIGS. 4 and 5, the dispatch module 140a of the dispatcher server 120 sends an email to the agent to notify the agent that this ticket has been assigned to them. Then, at step 755, the agent handles the ticket.

As should be understood form the description herein, aspects of the invention may be used to implement a method for distributing support tickets, the method comprising: receiving, via a web browser plugin, a set of ticket information extracted from a support ticket for a particular resource; associating the set of ticket information with a Universal Resource Location (URL) address for a dispatcher server; forwarding the set of ticket information to the URL address; distributing the support ticket, based on the particular resource and a comparison of the set of ticket information and a set of attributes for a plurality of support agents; and notifying a target support agent of the plurality of support agents of the support ticket. In embodiments, the set of ticket information includes a ticket identification, customer identification, support topic, geographic location of a user, and an error identification.

In embodiments, a service provider could offer to perform the processes described herein. In this case, the service provider can create, maintain, deploy, support, etc., of the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, a Uniform Resource Locator (URL) from an agent device, wherein the URL is provided responsive to a request for support by a user to a support system for a computing resource, the computing resource configured with a user interface, the request for support identifying the computing resource requiring support, and wherein the URL includes identifying information about the computing resource and an address of the computing device;
extracting, by the computing device, information from the URL;
assigning, by the computing device, a ticket to an agent selected from a plurality of agents assigned to support the computing resource based on the information from the URL and an agent registry, wherein the assigning is based on one or more dispatch rules, and wherein the agent registry includes data that define attributes of the plurality of agents assigned to support the computing resource;
updating, by the computing device and in response to the assigning, a dispatch list; and
notifying, by the computing device and in response to the assigning, the agent of the assigning the ticket to the agent.

2. The method of claim 1, wherein the URL is created by a plugin installed in a browser in the agent device, wherein the plugin is customized for the support system for the computing resource.

3. The method of claim 2, wherein the URL includes: the address of the computing device; a ticket identifier; a user identifier; a subject; and a geographic location.

4. The method of claim 3, wherein the URL includes information that identifies a channel in which the ticket was created.

5. The method of claim 4, wherein the channel is one of plural different channels associated with plural different computing resource support systems.

6. The method of claim 5, wherein the computing device is configured to perform the receiving, the extracting, the assigning, the updating, and the notifying for plural different URLs created for plural different tickets in the plural different channels.

7. The method of claim 5, wherein:
each of the plural different channels has a unique one of plural different plugins; and
the plugin installed in the browser in the agent device is one of the plural different plugins.

8. The method of claim 2, wherein the receiving comprises the computing device receiving a Hypertext Transfer Protocol (HTTP) POST request from the plugin installed in the browser in the agent device.

9. The method of claim 1, wherein the information extracted from the URL comprises a geographic location of a user that provided input that created the ticket.

10. The method of claim 9, wherein the agent registry stores data defining geographic locations of plural agents, and the assigning is based on comparing the geographic location of the user to the geographic locations of the plural agents.

11. The method of claim 10, wherein the agent registry stores data defining availability of the plural agents, and the assigning is further based on the availability of the plural agents.

12. The method of claim 1, wherein the notifying comprises sending an email to the agent.

13. The method of claim 1, wherein the computing device is a server that includes a PHP script, and the notifying comprises the PHP script using an email server application program interface (API) to send a notification to the agent.

14. The method of claim 1, wherein the computing device includes software provided as a service in a cloud environment.

15. A computer program product comprising one or more computer readable storage media having program instructions collectively stored on the one or more computer readable storage media, the program instructions executable to:
receive plural different Uniform Resource Locators (URLs) from plural agent devices monitoring different channels of different computing resource support systems, wherein the URL is provided responsive to a request for support by a user to at least one of the different computing resource support systems, the at least one of the different computing resource support systems configured with a user interface, the request for support identifying the at least one of the different computing resources requiring support, and wherein the URL includes identifying information about the at least one of the different computing resources and an address of a dispatch server; and
for each respective URL of the plural URLs:
extract information from the respective URL;
assign a ticket associated with the respective URL to a respective agent selected from a plurality of agents assigned to support the at least one of the different computing resource support systems associated with the respective URL based on comparing the information extracted from the respective URL to information in an agent registry, wherein the assigning is based on one or more dispatch rules, and wherein the agent registry includes data that define attributes of the plurality of agents assigned to support the different computing resource support systems;
update, in response to the assigning, a dispatch list; and
notify, in response to the assigning, the respective agent of the assigning the ticket to the respective agent.

16. The computer program product of claim 15, wherein:
the information extracted from the respective URL comprises a geographic location of a user that provided input that created the ticket;
the information in the agent registry defines geographic locations of plural agents; and
the assigning is based on comparing the geographic location of the user to the geographic locations of the plural agents.

17. The computer program product of claim 15, wherein each of the plural different URLs is created by one of plural different plugins installed in a browser in respective ones of the plural agent devices, each one of the plural different plugins being unique to one of the plural different channels of the different computing resource support systems.

18. A system comprising:
a processor, a computer readable memory, one or more computer readable storage media, and program instructions collectively stored on the one or more computer readable storage media, the program instructions executable to:
receive plural different Uniform Resource Locators (URLs) from plural agent devices monitoring different channels of different computing resource support systems, wherein the URL is provided responsive to a request for support by a user to at least one of the different computing resource support systems, the at least one of the different computing resource support systems configured with a user interface, the request for support identifying the at least one of the different computing resources requiring support, and wherein the URL includes identifying information about the at least one of the different computing resources and an address of a dispatch server; and
for each respective URL of the plural URLs:
extract information from the respective URL;
assign a ticket associated with the respective URL to a respective agent selected from a plurality of agents assigned to support the at least one of the different computing resource support systems associated with the respective URL based on comparing the information extracted from the respective URL to information in an agent registry, wherein the assigning is based on one or more dispatch rules, and wherein the agent registry includes data that define attributes of the plurality of agents assigned to support the different computing resource support systems;
update, in response to the assigning, a dispatch list; and
notify, in response to the assigning, the respective agent of the assigning the ticket to the respective agent.

19. The system of claim 18, wherein:
the information extracted from the URL comprises a geographic location of a user that provided input that created the ticket;
the information in the agent registry defines geographic locations of plural agents; and
the assigning is based on comparing the geographic location of the user to the geographic locations of the plural agents.

20. The system of claim 18, wherein each of the plural different URLs is created by one of plural different plugins installed in a browser in respective ones of the plural agent devices, each one of the plural different plugins being unique to one of the plural different channels of the different computing resource support systems.

\* \* \* \* \*